United States Patent
Kulkarni

(10) Patent No.: US 9,226,143 B2
(45) Date of Patent: *Dec. 29, 2015

(54) CONTROLLING APPLICATION ACCESS TO MOBILE DEVICE FUNCTIONS

(71) Applicant: NXP B.V., Eindhoven (NL)

(72) Inventor: Giten Kulkarni, Bangalore (IN)

(73) Assignee: NXP B.V., Eindhoven (NL)

( * ) Notice: Subject to any disclaimer, the term of this patent is extended or adjusted under 35 U.S.C. 154(b) by 134 days.

This patent is subject to a terminal disclaimer.

(21) Appl. No.: 14/175,149

(22) Filed: Feb. 7, 2014

(65) Prior Publication Data

US 2014/0228001 A1    Aug. 14, 2014

(30) Foreign Application Priority Data

Feb. 8, 2013    (EP) .................................... 13154657

(51) Int. Cl.
| | |
|---|---|
| H04L 9/32 | (2006.01) |
| H04L 29/06 | (2006.01) |
| G06F 9/46 | (2006.01) |
| H04W 12/08 | (2009.01) |
| G06F 21/62 | (2013.01) |
| H04W 12/04 | (2009.01) |
| H04W 4/00 | (2009.01) |

(52) U.S. Cl.
CPC ............. *H04W 12/04* (2013.01); *G06F 21/629* (2013.01); *H04L 63/10* (2013.01); *H04L 63/123* (2013.01); *H04W 4/003* (2013.01); *H04W 12/08* (2013.01); *H04L 63/0823* (2013.01)

(58) Field of Classification Search
CPC ...................................................... G06F 21/62
See application file for complete search history.

(56) References Cited

U.S. PATENT DOCUMENTS

2004/0199787 A1* 10/2004 Hans et al. ..................... 713/200
2009/0222903 A1* 9/2009 Sherkin et al. ................... 726/10
2010/0050271 A1* 2/2010 Saarisalo ......................... 726/28
2010/0138908 A1* 6/2010 Vennelakanti et al. ......... 726/11
2014/0018041 A1    1/2014 Summerer

FOREIGN PATENT DOCUMENTS

| DE | 10 2011 015 710 A1 | 10/2012 |
|---|---|---|
| EP | 2 096 569 A1 | 9/2009 |
| EP | 12194412.8 | 11/2012 |

OTHER PUBLICATIONS

GlobalPlatform Device Technology; "Secure Element Access Control, Version 1.0"; 86 pages (May 2012).
Menezes, et al; "Handbook of Applied Cryptography: Overview of Cryptography"; CRC Press, Boca Raton, FL, US; Chapter 1, pp. 22-30 Chapter 11, pp. 472-473, Chapter 13, pp. 547-549, 555-556 pages provided by EESR no title pages provided (Jan. 1, 1996).
Extended European Search Report for application No. 13154657.4 (Apr. 25, 2013).

* cited by examiner

*Primary Examiner* — Tae Kim
*Assistant Examiner* — Louis Teng

(57) ABSTRACT

There is described a method of controlling application access to predetermined functions of a mobile device (240), the method comprising (a) providing a set of keys, each key corresponding to one of the predetermined functions, (b) receiving (225) an application from an application provider (220, 221, 222, 223) together with information identifying a set of needed functions, (c) generating a signed application by signing the received application with each of the keys that correspond to one of the needed functions identified by the received information, and (d) transmitting (227) information identifying the needed functions and the signed application and a set of access rules to a Secure Element of the mobile device (240). There is also described a device for controlling application access and a system for controlling and authenticating application access. Furthermore, there is described a computer program and a computer program product.

19 Claims, 3 Drawing Sheets

CONTROLLING APPLICATION ACCESS TO MOBILE DEVICE FUNCTIONS

CROSS-REFERENCE TO RELATED APPLICATIONS

This application claims the priority under 35 U.S.C. §119 of European patent application no. 13154657.4, filed on Feb. 8, 2013, the contents of which are incorporated by reference herein.

FIELD OF THE INVENTION

The present invention relates to the field of controlling application access to certain functions of a mobile device, such as functions relating to NFC (Near Field Communication) and SEs (Secure Elements).

ART BACKGROUND

Recent mobile communication devices, such as e.g. cellular phones, smartphones, PDAs, and tablets, are often equipped with various advanced technologies for handling and using sensitive information. An example of such technologies is the combination of NFC and Secure Elements, which may e.g. be used in connection with various payment applications which involve use of sensitive information, such as credit card information, bank account numbers, passwords etc. This sensitive information has to be protected but at the same time the applications need to be able to access the relevant secure functions in order to serve their intended purpose.

Some mobile device operating systems, such as the Android-based operating systems, include functions for authenticating applications. This may be done by determining whether the application is genuine, i.e. by validating that the application has been signed by the application provider. However, the number of secure functions which an application actually needs to access may differ in dependence on its specific purpose. Accordingly, simply giving an application access to all or none of the secure functions may constitute a security risk in cases where an application is allowed to access more secure functions than it actually needs. Furthermore, when a new application provider enters the market, authentication of applications provided by the new provider will not be possible until the mobile operating system has been updated to include the corresponding certificate.

In view of the above, it has been suggested to let a trusted third party (also referred to as a Trusted Service Manager or TSM) sign the applications with keys corresponding to the functions or sets of functions which the application needs to access. By storing corresponding certificates in the operating system of the mobile device, the mobile device may determine whether an application's request for accessing a particular function should be allowed by verifying whether the application has been signed accordingly. Although this approach overcomes many of the problems described above, it still suffers from some drawbacks.

One drawback is that the access certificates are pre-installed as part of the mobile device operating and may therefore not be accessible to the TSM in case the TSM needs to manage the certificates, e.g. upon expiry of a certificate or in order to delete, replace or add a new certificate. Thus, an over-the-air (OTA) update is required to perform the desired certificate management.

A further drawback is that it is difficult to change application permissions once these have been granted by signing the application at the TSM. More specifically, a removal or change of access permissions for one or more installed applications while other applications are still allowed access will require that these other application are signed anew with new (valid) certificates. Again, an additional OTA which involves OEM (original equipment manufacturer) and/or MNO (mobile network operator) interaction is required to update the access certificates.

Finally, having different TSMs (and hence different access certificates) in different geographical regions forces the OEM to provide different (i.e. region-specific) operating system image builds.

There may accordingly be a need for an improved way of controlling application access to secure functions of mobile devices without the drawbacks described above.

SUMMARY OF THE INVENTION

This need may be met by the subject matter according to the independent claims. Advantageous embodiments of the present invention are set forth in the dependent claims.

According to a first aspect there is provided a method of controlling application access to predetermined functions of a mobile device, the method comprising (a) providing a set of keys, each key corresponding to one of the predetermined functions, (b) receiving an application from an application provider together with information identifying a set of needed functions, (c) generating a signed application by signing the received application with each of the keys that correspond to one of the needed functions identified by the received information, and (d) transmitting information identifying the needed functions and the signed application and a set of access rules to a Secure Element of the mobile device.

This aspect is based on the idea that by associating each of the mobile device's predetermined functions with a unique key, access to a particular set of the predetermined functions can be controlled for a given application by signing the application with the keys corresponding to the particular set of functions. Thereby, the mobile device is able to determine which of its predetermined functions a given application is allowed to access by checking which keys the application has been signed with. Furthermore, by transmitting information identifying the needed functions and the signed application and a set of access rules to the Secure Element of the mobile device, the access rules can be defined and even amended without the need for updating the operating system of the mobile device.

In the present context, the term "mobile device" may particularly denote a mobile communication device, such as a mobile phone, a smart phone, a personal digital assistant (PDA), a tablet computer, a laptop or any similar device capable of communication via a data communication network, such as cellular communication network or a wired or wireless data network.

In the present context, the term "predetermined functions" may particularly denote a selection of functions or features provided by a mobile device operating system and/or mobile device hardware. In some embodiments, a predetermined function may particularly denote a group of functions which together provide a certain service or feature which an application may want to access.

In the present context, the term "information identifying a set of needed functions" may in particular denote a list, e.g. in a text file, of those of the predetermined functions which the application needs to be able to use.

In the present context, the term "keys" may particularly denote cryptographic keys which can in particular be used to electronically sign a file or a set of data by applying a suitable cryptographic algorithm to the file or set of data together with the key.

In the present context, the term "application" may particularly denote a program for a mobile device, such as the program applications commonly referred to as "apps" or a remote application residing at a location external to the mobile device (e.g. in the cloud).

In the present context, the term "signed application" denotes an installation file or an executable file or program which has been signed with one or more cryptographic keys.

In the present context, the term "application provider" may particularly denote a server or an entity which directly or indirectly makes applications available to users of mobile devices. In other words, the application provider may be a developer or an application store through which the application is available for download to mobile devices.

In the present context, the term "needed functions" may particularly denote a subset of the predetermined functions which the application needs to be able to access in order to perform as intended by the application developer.

In the present context, the term "access rules" may particularly denote a rule specifying that a particular application should be given access to a particular function provided the particular application has been signed with a key corresponding to a particular certificate.

In the present context, the term "Secure Element" may particularly denote a Secure Element as specified by the GlobalPlatform standard.

By signing the application with those keys that correspond to the set of functions which the applications needs to be able to access, it becomes possible to determine whether the application is authorized to access a particular function or not by checking whether the application has been signed with the key corresponding to the particular function. Further, by storing information identifying the needed functions and the signed application and a set of access rules in the Secure Element of the mobile device, the access rules can be defined and even amended without the need for updating the operating system of the mobile device. The transmission of the information and access rules to the Secure Element is secure in the sense that the transmitting party or device (such as a TSM (Trusted Service Manager)) has to be authorized to access the Secure Element and also in the sense that the transmission takes place via a secured (i.e. encrypted) connection to the Secure Element.

Thereby, application access to the predetermined functions can be managed, updated and controlled in a simple and secure way without the need for OEM/MNO interaction for an OTA update of the mobile device. In particular, the security can be ensured by assuring that the set of keys used to sign the application is kept confidential, e.g. at a designated entity.

According to an embodiment, the transmitted information includes a set of function identifiers and an application identifier.

In other words, the application is identified by a unique application identifier, and each of the functions is identified by a unique function identifier.

According to a further embodiment, the method further comprises transmitting the signed application to the application provider.

Thereby, the application provider is able to distribute the signed application to users of mobile devices such that the users may use the application.

According to a further embodiment, the method further comprises transmitting a set of certificates corresponding to the set of keys together with information mapping each certificate to one of the predetermined functions to the Secure Element of the mobile device.

In the present context, the term "certificate" may particularly denote a data element or file which is related to a key in such a way that by applying a cryptographic algorithm to the certificate and a file, such as an application, it can be determined whether the file (e.g. application) has been signed with the key. A certificate may also be referred to as a "public key".

In the present context, the term "mapping" may particularly denote a relationship between corresponding items in two distinct groups. In other words, the mapping between certificates and predetermined functions may determine, e.g. in a table or similar structure, which key corresponds to which predetermined function.

Upon receiving the set of certificates and the mapping information, the mobile device can store these items in the Secure Element of the mobile device. Thereby, the will be able to apply the certificates and mapping information in order to determine whether a request from an application to access a particular function should be granted.

According to a further embodiment, the step of generating a set of keys comprises (a) transmitting an initial set of keys to an owner of the predetermined functions, wherein each key of the initial set of keys corresponds to one of the predetermined functions, (b) at the owner, root signing each key of the transmitted initial set of keys, and (c) receiving the set of keys which has been root signed by the owner.

In the present context, the term "owner of the predetermined functions" may in particular denote a server belonging to the entity that provides the hardware and/or software which performs the predetermined functions.

By having the keys root signed by the owner, it can be assured that only keys validated by the owner can be used to authorize access to the predetermined functions. Thereby, by letting the owner act as a certificate authority (CA), security can be further improved.

According to a further embodiment, the predetermined functions relate to mobile device services involving Near Field Communication (NFC) and/or the Secure Element (SE).

By signing applications with a number of keys, where each key is associated with a particular function relating to e.g. use of the NFC and/or SE features of a mobile device, it becomes possible to control how many and which specific functions each application is allowed to access and use. In other words, access to the predetermined functions can be controlled in a dynamic and scalable manner without interaction from OEM and/or MNO, as required for a OTA update of the mobile device operating system.

According to a further embodiment, the method further comprises determining whether the received application is to be signed based on an identity of the application provider, wherein the step of generating a signed application is only carried out if it is determined that the received applications is to be signed.

The determination of the whether the received application is to be signed may e.g. be based on checking a list of approved application providers, e.g. application providers which have a corresponding business agreement with the involved parties, such as a trusted service manager (TSM) who performs the checking and signing, a function owner and a mobile device manufacturer.

According to a second aspect, there is provided a device for controlling application access to predetermined functions of a mobile device, the device comprising (a) a unit adapted for generating a set of keys, each key corresponding to one of the predetermined functions, (b) a unit adapted for receiving an application from an application provider together with information identifying a set of needed functions, (c) a unit adapted for generating a signed application by signing the received application with each of the keys that correspond to one of the needed functions identified by the received information, and (d) a unit adapted for transmitting information identifying the needed functions and the signed application and a set of access rules to a Secure Element of the mobile device.

The device according to the second aspect is adapted to perform the method according to the first aspect or any of the above described embodiments.

The units of the device may be implemented as separate hardware units or as functional units in a single hardware unit, such as a server.

The device is preferably connected to a communications network, such as the Internet.

The unit adapted for receiving an application together with information may receive the aforementioned items from the application provider via a network connection, e.g. through the Internet, or by means of any suitable input interface, such as via USB, optical or other storage media.

The device can, e.g. as an independent server, provide a secure and effective way of controlling application access to sensitive functions in mobile devices. In particular, by using a key for each predetermined function, it is possible to allow a given application to access exactly the needed sensitive functions instead of merely giving full access or no access at all. Thereby, the device allows for scalable and dynamic access control.

According to a third aspect, there is provided a system for controlling and authenticating application access to predetermined functions of a mobile device, the system comprising (a) a device according to the second aspect, (b) an application provider, and (c) a mobile device comprising a Secure Element, wherein (d) the application provider is adapted to transmit an application together with information identifying a set of needed functions to the device, (e) the device is adapted to generate a signed application based on an application and information identifying a set of needed functions received from the application provider, (f) the device is adapted to transmit the signed application to the application provider, (g) the device is adapted to transmit information identifying the needed functions and the signed application, a set of access rules, and a set of certificates corresponding to the generated set of keys together with information mapping each certificate to one of the predetermined functions to the Secure Element of the mobile device, and (h) the mobile device is adapted to store the information identifying the needed functions and the signed application, the set of access rules, and the set of certificates and the mapping information in the Secure Element.

The device, application provider and mobile device may be geographically separated from each other.

The transmissions between the application provider and the device as well as from the device to the mobile device may preferably be performed via a communications network, such as the Internet, or any other suitable way of transmission. The transmissions are preferably secure, such that unauthorized parties can neither access the transmitted data nor transmit false data to any of the authorized parties, i.e. device, application provider and mobile device.

The system according to this aspect is based on the idea that by associating each of the mobile device's predetermined functions with a unique key, access to a particular set of the predetermined functions can be controlled for a given application by signing the application with the keys corresponding to the particular set of functions and storing corresponding access rules in the Secure Element of the mobile device.

According to an embodiment, the mobile device is further adapted to retrieve access rules stored in the Secure Element and to apply the retrieved access rules in order to determine whether an application is to be allowed access to a function.

In other words, when an application requests access to a particular function, the mobile device retrieves the relevant access rules by sending a corresponding request to the Secure Element. Based on the retrieved access rules, the mobile device then determines whether access to the requested function is to be granted or not.

According to a further embodiment, the system comprises an owner of the predetermined functions, the owner being adapted to receive an initial set of keys from the device, wherein each key of the initial set of keys corresponds to one of the predetermined functions, the owner being further adapted to root sign each key of the received initial set of keys and to transmit the root signed keys to the device.

By having the keys root signed by the owner, it can be assured that only keys validated by the owner can be used to authorize access to the predetermined functions.

According to a further embodiment, the mobile device is adapted to receive a signed application from the application provider and to determine which of the predetermined functions the signed application is authorized to access based on the set of certificates and the access rules stored in the Secure Element.

Thereby, the mobile device is able to determine which of its predetermined functions a given application is allowed to access by checking which keys the application has been signed with and utilizing the access rules and the stored mapping information.

The determination may e.g. be performed by the mobile device during installation of the application and/or every time the application attempts to access one of the predetermined functions. Alternatively, the mobile device may refer to a stored (cached) authentication result from a previous attempt. With the latter approach, the use of processing resources as well as time consumption can be reduced.

Further enhancement of security may be achieved by verifying that the trust chain of the certificate contains the issuer identity of the root signer.

According to a fourth aspect, there is provided a computer program comprising computer executable instructions which when executed by a computer causes the computer to perform the steps of the method according to the first aspect or any of the above embodiments thereof.

According to a fifth aspect, there is provided a computer program product comprising a computer readable data carrier loaded with a computer program according to the fourth aspect.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is part of the disclosure of this document.

The aspects defined above and further aspects of the present invention are apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
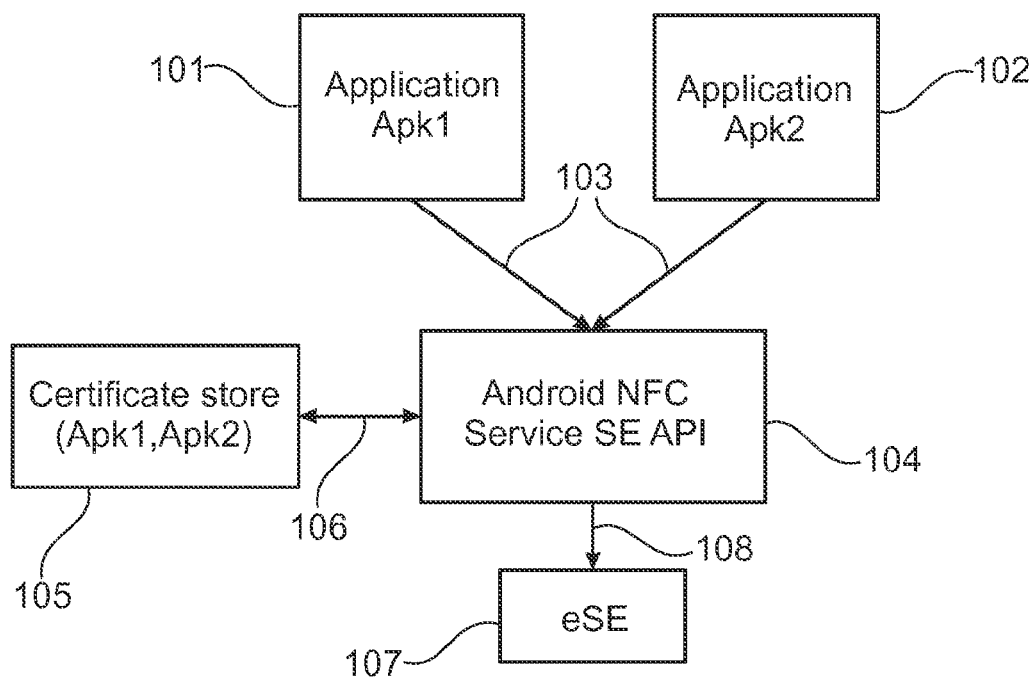
FIG. 1 shows application authorization in a prior art mobile device.

The illustration in the drawing is schematic. It is noted that in different figures, similar or identical elements are provided with the same reference signs or with reference signs, which differ only within the first digit.

FIG. 1 shows application authorization in an Android-based mobile device in accordance with the prior art. More specifically, a first application 101 and a second application 102 request to access the Android NFC Service SE (secure element) API (application programming interface) 104 as indicated by the arrows 103. In order to determine whether the applications 101, 102 are authorized to access the API 104, a message is, as indicated by the arrow 106, sent to the certificate store 105 where it is checked whether the application provider's certificate is listed in the certificate store and optionally associated with the application name. The result of this check is sent back to the API 104. If the signatures are determined as being authentic, the API 104 provides access to the mobile device's embedded secure element 107 as indicated by arrow 108. If a signature is determined as being not authentic, the corresponding request is declined.

As can be seen, the setup shown in FIG. 1 makes it possible to check whether each application 101, 102 is authentic, i.e. whether it has been signed with the corresponding application provider's key. However, the system is static and non-scalable as it is not possible to give an application 101, 102 access to a subset of the available secure functions. Furthermore, new application developers will have to await an update of the mobile device software (operating system) to have a certificate added to the certificate store 105.

Figure 2:
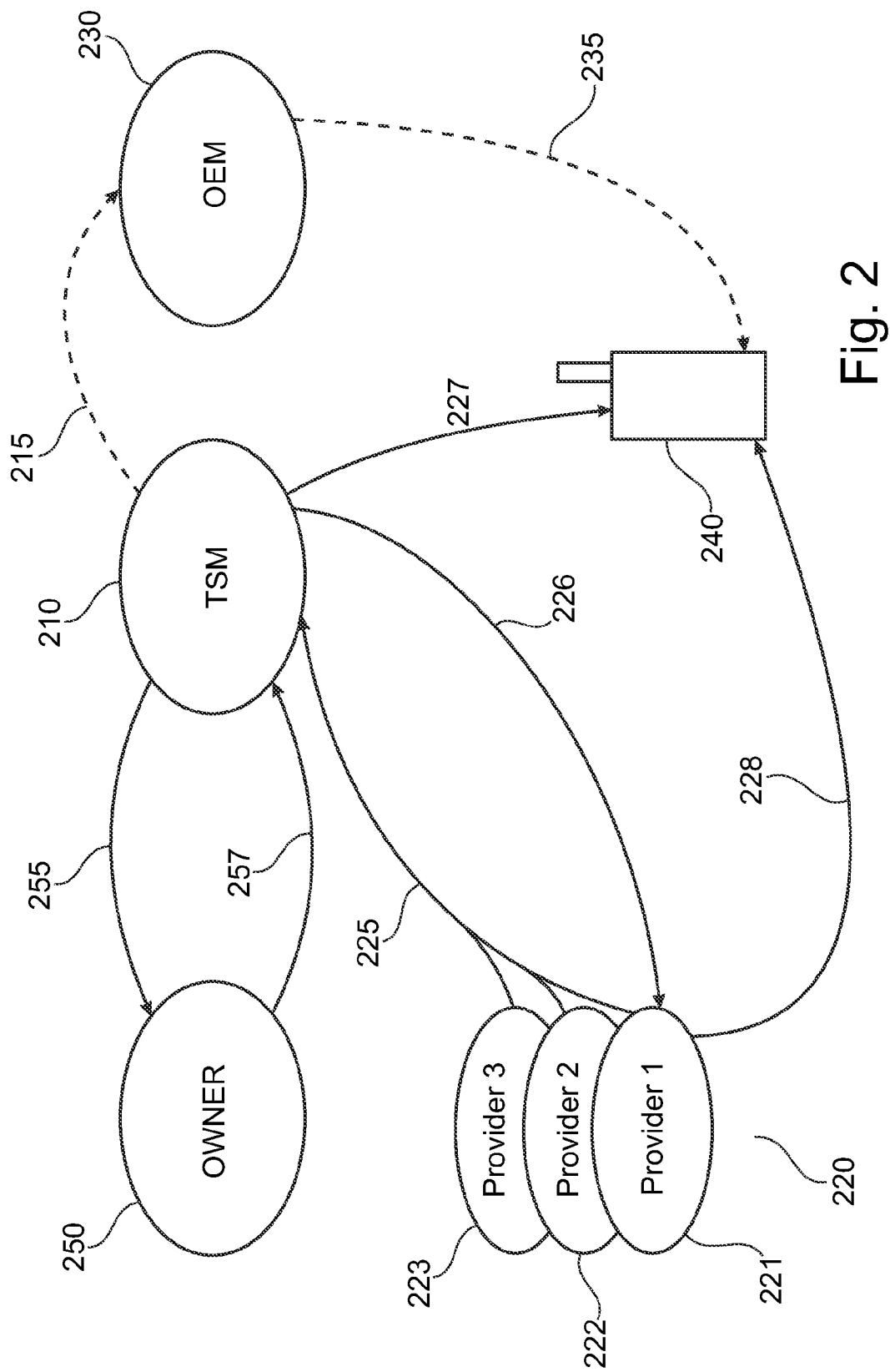
FIG. 2 shows a schematic illustration of a system for controlling application access to restricted functions in accordance with an embodiment.

FIG. 2 shows a schematic illustration of a system for controlling application access to restricted functions in accordance with an embodiment. More specifically, the system includes a trusted service manager (TSM) 210, application providers 221, 222, and 223 (commonly referred to as application providers 220), a mobile device manufacturer (OEM) 230, a mobile device 240 comprising a Secure Element (SE), and an owner 250 (i.e. responsible provider) of the restricted mobile device functions. As it can be seen, FIG. 2 shows the application providers 220 as a first provider 221, a second provider 222 and a third provider 223. However, this is merely an example and the present invention is not limited to exactly three application providers 220.

The TSM 210 corresponds to the device of the present invention and is adapted to create a set of keys for signing applications, where each key is unique and associated with one (and only one) of the restricted mobile device functions, a group of the functions or all functions. In the latter case, the key is intended to give full access, e.g. for administration purposes. The TSM 210 may be constituted as a dedicated server under the control of a mobile device manufacturer (e.g. OEM 230), a mobile network operator (MNO), a service provider etc. and thereby constitute a trusted third party (TTP) relative to the providers 220 and the OEM 230 in the sense that these entities do not have access to the keys.

The providers 220 develop and/or distribute applications for mobile devices, e.g. by making them available for download in an online store or by providing them directly to a mobile device manufacturer for pre-installation on the device. In order to gain access to sensitive mobile device functions, such as e.g. services involving NFC and SE technology, the providers 220 transmit the applications (i.e. new or updated applications) to the TSM 210 for signing as indicated by arrow 225. Together with each transmitted application, the providers 220 transmit a list of the relevant functions to allow the TSM 210 to sign the application with the corresponding keys. After signing the applications, the TSM 210 transmits the signed applications back to the providers 220 as indicated by arrow 226. Thereafter, the signed applications are, as indicated by arrow 228, provided to a relevant mobile device 240 upon request, i.e. after a user of the mobile device 240 has bought the application in an online application store or accepted to download an updated version of the application.

The TSM 210 also transmits, as indicated by arrow 227, an application identifier (appID) identifying the signed application, one or more function identifiers (funcID) and a set of access rules to the Secure Element of the mobile device 240. Furthermore, the transmission 227 to the Secure Element of the mobile device 240 may include a set of certificates corresponding to the set of keys with which the application has been signed by the TSM 210. The latter is the case when certificates are updated or changed. The access rules define which certificate(s) an application has to be signed with in order to obtain access to a particular function. Thereby, by changing the certificates and/or access rules stored in the Secure Element of the mobile device 240, the TSM 210 can control access and change which functions a specific application (identified by a unique appID) has access to without the need for an update of the complete operating system of the mobile device 240.

The set of certificates corresponds to the set of keys in the sense that each certificate is paired with one (and only one) key such that the certificate can be used to determine whether an application (or another set of data) has been signed with the corresponding key.

Thereby, using the access rules stored in the Secure Element, the mobile device 240 can determine whether an application is allowed to access particular functions by using the certificates to determine whether the application has been signed with the keys corresponding to the particular functions.

The TSM 210 also (optionally) transmits, as indicated by arrow 215, a master certificate to the OEM 230. The master certificate is only used to sign one or more TSM-specific application(s). The OEM 230 implements the master certificate in the operating system(s) which is installed into its devices 240 during the manufacturing process or later on in connection with an update of the operating system. This is indicated by arrow 235.

As illustrated by the arrows 255 and 257, the system provides the further optional feature that the TSM 210 transmits the generated (initial) set of keys to the owner 250 who root signs the keys and transmits them back to the TSM 210. This way, the owner 250, e.g. a manufacturer or provider of NFC and SE technology, may act as a certificate authority (CA).

Figure 3:
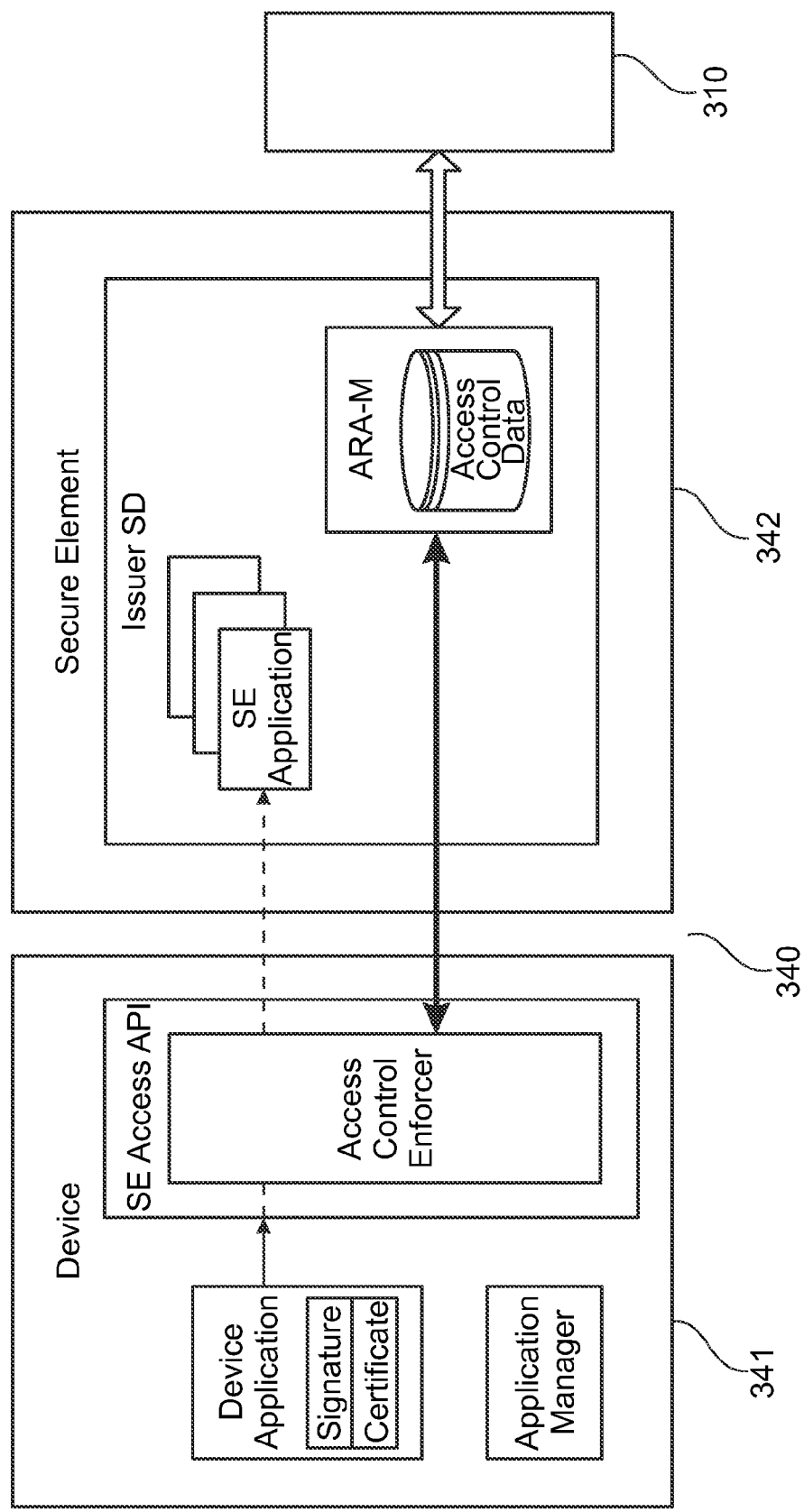
FIG. 3 shows a schematic illustration of access control to restricted functions in a mobile device in accordance with an embodiment.

An example of the operation of a mobile device 340 running an Android operating system 341 and comprising an SE 342 in accordance with the GlobalPlatform standard will now be given with reference to FIG. 3. It is noted that FIG. 3 shows a standard structure in accordance with GlobalPlatform, which is used in the present embodiment of the invention. During operation of the mobile device 340, an application 343 (provided by one of the application providers 220 and installed on the mobile device 340) requests access to a function of the Secure Element via the Access Control Enforcer (ACE) of the SE Access API in the operating system of the mobile device 340. The ACE communicates the corresponding appID and funcID(s) to the Access Rule Application Master (ARA-M) in the SE 342. The ARA-M determines, based on the received IDs, whether corresponding access rules are stored in the ARA-M and communicates the result back to the ACE. If an access rule is present which permits the application request, the ACE allows the requesting application to access the requested function by setting up a corresponding connection to the requested function in the SE. However, in accordance with the present invention, the structure shown in FIG. 3 may also be used to control access to mobile device functions. This can be done by assigning GlobalPlatform-like appIDs to represent the mobile functions. In this case, the ARA-M determines, based on the request from the ACE, a relevant set of access rules, i.e. a subset of the access rules stored by the ARA-M corresponding to the mobile function appIDs. Alternatively the ACE could retrieve all the access rules in the ARA-M and use a subset corresponding to mobile function appID for mobile function access control. This subset is output to the ACE, which then applies the received set of access rules to determine whether access to the requested mobile device functions should be granted. In yet another alternative, the GlobalPlatform ACE is not modified for the mobile function appID and access rules. Instead, a separate GlobalPlatform ACE like function is implemented for mobile function access which handles the mobile function appIDs and access rules. The access rules stored in the ARA-M of the SE 342 may be managed by the TSM 310. Thereby, by allowing the TSM to control (via a secure connection) the access rules stored in the ARA-M of the SE 342, it is possible to use the GlobalPlatform structure shown in FIG. 3 to implement the present invention.

A detailed description of the SE Access API and the ARA-M can be found in GlobalPlatform Device Technology, Secure Element Access Control, Version 1.0, Public Release. May 2012, Document Reference: GPD_SPE_013, available from http://www.globalplatform.org.

It is noted that, unless otherwise indicated, the use of terms such as "upper", "lower", "left", and "right" refers solely to the orientation of the corresponding drawing.

It should be noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A method of controlling application access to predetermined functions of a mobile device, the method comprising:
generating, with a Trusted Service Manager (TSM) a set of keys, wherein each key is unique and corresponds to only one of the predetermined functions;
receiving, in the TSM, an application from an application provider together with information identifying a set of needed functions;
generating, in the TSM, a signed application by digitally signing the received application with each of the keys that respectively corresponds to one of the needed functions identified by the received information; and
transmitting information identifying the needed functions and the signed application and a set of access rules from the TSM to a Secure Element of the mobile device;
wherein the method is performed by one or more hardware processors.

2. The method according to claim 1, wherein the transmitted information includes a set of function identifiers and an application identifier.

3. The method according to claim 1, further comprising:
transmitting the signed application from the TSM to the application provider.

4. The method according to claim 1, further comprising:
transmitting a set of certificates corresponding to the set of keys together with information mapping each certificate to one of the predetermined functions from the TSM to the Secure Element of the mobile device.

5. The method according to claim 1, wherein the step of generating the set of keys comprises:
transmitting an initial set of keys from the TSM to an owner of the predetermined functions, wherein each key of the initial set of keys corresponds to one of the predetermined functions; and
receiving, in the TSM, the set of transmitted keys after it has been root signed by the owner.

6. The method according to claim 1, wherein the predetermined functions relate to mobile device services involving Near Field Communication and/or the Secure Element.

7. The method according to claim 1, further comprising:
determining whether the received application is to be signed based on an identity of the application provider, wherein the step of generating a signed application is only carried out if it is determined that the received applications is to be signed.

8. A device configured to control application access to predetermined functions of a mobile device, the device comprising:
one or more hardware processors;
a Trusted Service Manager (TSM) configured to generate a set of keys, wherein each key is unique and corresponds to only one of the predetermined functions,
a TSM configured to receive an application from an application provider together with information identifying a set of needed functions,
a TSM configured to generate a signed application by digitally signing the received application with each of the keys that respectively corresponds to one of the needed functions identified by the received information, and
a TSM configured to transmit information identifying the needed functions and the signed application and a set of access rules to a Secure Element of the mobile device.

9. A system for controlling and authenticating application access to predetermined functions of a mobile device, the system comprising:
a device configured to control application access to predetermined functions of a mobile device, the device comprising:
one or more hardware processors;
a Trusted Service Manager (TSM) configured to generate a set of keys, wherein each key is unique and corresponds to only one of the predetermined functions, a TSM configured to receive an application from an application provider together with information identifying a set of needed functions, a TSM configured to generate a signed application by digitally signing the received application with each of the keys that respectively corresponds to one of the needed functions identified by the received information, and a TSM configured to transmit information identifying the needed functions and the signed application and a set of access rules to a Secure Element of the mobile device;

an application provider; and a mobile device comprising a Secure Element, wherein the application provider is configured to transmit an application together with information identifying a set of needed functions to the device, the device is configured to generate a signed application based on an application and information identifying a set of needed functions received from the application provider, the device is configured to transmit the signed application to the application provider, the device is configured to transmit information identifying the needed functions and the signed application, a set of access rules, and a set of certificates corresponding to the generated set of keys together with information mapping each certificate to one of the predetermined functions to the Secure Element of the mobile device, and the mobile device is configured to store the information identifying the needed functions and the signed application, the set of access rules, and the set of certificates and the mapping information in the Secure Element.

10. The system according to claim 9, wherein the mobile device is further configured to retrieve access rules stored in the Secure Element and to apply the retrieved access rules in order to determine whether an application is to be allowed access to a function.

11. The system according to claim 9, further comprising an owner of the predetermined functions, the owner being configured to receive an initial set of keys from the device, wherein each key of the initial set of keys corresponds to one of the predetermined functions, the owner being further configured to root sign each key of the received initial set of keys and to transmit the root signed keys to the device.

12. The system according to claim 9, wherein the mobile device is configured to receive a signed application from the application provider and to determine which of the predetermined functions the signed application is authorized to access based on the access rules and the set of certificates stored in the Secure Element.

13. A non-transitory machine-readable storage medium encoded with instructions for execution by a Trusted Service Manager (TSM), the non-transitory machine-readable storage medium comprising:

instructions for generating a set of keys, wherein each key is unique and corresponds to only one of the predetermined functions;

instructions for receiving an application from an application provider together with information identifying a set of needed functions;

instructions for generating a signed application by digitally signing the received application with each of the keys that respectively corresponds to one of the needed functions identified by the received information; and instructions for transmitting information identifying the needed functions and the signed application and a set of access rules from the TSM to a Secure Element of the mobile device.

14. The non-transitory machine-readable storage medium of claim 13, wherein the transmitted information includes a set of function identifiers and an application identifier.

15. The non-transitory machine-readable storage medium of claim 13, further comprising:

instructions for transmitting the signed application from the TSM to the application provider.

16. The non-transitory machine-readable storage medium of claim 13, further comprising:

instructions for transmitting a set of certificates corresponding to the set of keys together with information mapping each certificate to one of the predetermined functions from the TSM to the Secure Element of the mobile device.

17. The non-transitory machine-readable storage medium of claim 13, further comprising:

instructions for transmitting an initial set of keys from the TSM to an owner of the predetermined functions, wherein each key of the initial set of keys corresponds to one of the predetermined functions; and instructions for receiving the set of transmitted keys after it has been root signed by the owner.

18. The non-transitory machine-readable storage medium of claim 13, wherein the predetermined functions relate to mobile device services involving Near Field Communication and/or the Secure Element.

19. The non-transitory machine-readable storage medium of claim 13, further comprising:

instructions for determining whether the received application is to be signed based on an identity of the application provider, wherein the step of generating a signed application is only carried out if it is determined that the received applications is to be signed.

* * * * *